US008304715B2

(12) United States Patent
Misharin et al.

(10) Patent No.: US 8,304,715 B2
(45) Date of Patent: Nov. 6, 2012

(54) ION CYCLOTRON RESONANCE MASS SPECTROMETER SYSTEM AND A METHOD OF OPERATING THE SAME

(75) Inventors: Alexander Misharin, Columbia, MD (US); Roman Zubarev, Uppsala (SE)

(73) Assignee: Science & Engineering Services, Inc., Columbia, MD (US)

( * ) Notice: Subject to any disclaimer, the term of this patent is extended or adjusted under 35 U.S.C. 154(b) by 402 days.

(21) Appl. No.: 12/756,015

(22) Filed: Apr. 7, 2010

(65) Prior Publication Data

US 2011/0248159 A1 Oct. 13, 2011

(51) Int. Cl.
*H01J 49/00* (2006.01)
*B01D 59/44* (2006.01)

(52) U.S. Cl. ........................................ 250/282; 250/291

(58) Field of Classification Search .................. 250/282, 250/291

See application file for complete search history.

(56) References Cited

U.S. PATENT DOCUMENTS

| | | | | |
|---|---|---|---|---|
| 4,581,533 | A * | 4/1986 | Littlejohn et al. | 250/282 |
| 4,933,547 | A * | 6/1990 | Cody, Jr. | 250/282 |
| 4,982,087 | A * | 1/1991 | Allemann et al. | 250/291 |
| 5,389,784 | A * | 2/1995 | Weller | 250/291 |
| 2011/0240841 | A1* | 10/2011 | Lange | 250/282 |

OTHER PUBLICATIONS

U.S. Appl. No. 12/756,015, filed Apr. 7, 2010, Misharin, et al.
U.S. Appl. No. 13/168,690, filed Jun. 24, 2011, Misharin, et al.

* cited by examiner

*Primary Examiner* — Nikita Wells
*Assistant Examiner* — Johnnie L Smith
(74) *Attorney, Agent, or Firm* — Oblon, Spivak, McClelland, Maier & Neustadt, L.L.P.

(57) ABSTRACT

A measuring cell of an ICR mass spectrometer and a method of operating a measuring cell of the ICR mass spectrometer. The method and system trap ions in a first compartment of the ICR measuring cell by generating an electric potential well in the direction of the magnetic field with a minimum of the electric potential well located inside the first compartment. The method and system excite cyclotron motion of the ions trapped in the first compartment. The method and system transfer at least a part of the excited ions from the first compartment to a second compartment of the ICR measuring cell by displacement of a position of the minimum of the electric potential well from the first compartment to the second compartment. The ions are transferred by displacing the position of the minimum of the electric potential well from the first compartment to the second compartment preferably over a period of time equal to or longer than a characteristic period of ion oscillations along the direction of the magnetic field in the electric potential well. The method and system detect ion cyclotron motion of at least a part of the ions in the second compartment.

36 Claims, 13 Drawing Sheets

10
30
40
B
Ions from an ion source
"Excitation" compartment
"Detection" compartment
Voltage (V)
t0
t1
t2
33
Time

ION CYCLOTRON RESONANCE MASS SPECTROMETER SYSTEM AND A METHOD OF OPERATING THE SAME

CROSS REFERENCE TO RELATED APPLICATIONS

This application is related to "SPECTRAL DECONVOLUTION IN ION CYCLOTRON RESONANCE MASS SPECTROMETER" filed Apr. 7, 2010, U.S. Ser. No. 12/755,977, the entire contents of which are incorporated herein by reference.

BACKGROUND OF THE INVENTION

1. Field of Invention

This invention relates to a system and method of operating a measuring cell of an ion cyclotron resonance (ICR) mass spectrometer (MS), preferably of a Fourier transform ICR (FTICR) MS.

2. Discussion of the Background

In an ion cyclotron resonance mass spectrometer, the mass-specific cyclotron motions of the ions in a magnetic field are detected as image currents induced by the ions in detection electrodes. Typically, in ICR mass spectrometers, the detection of fundamental frequencies of ion oscillations is performed.

Currently, the time of analysis and its sensitivity become the most valuable analytical parameters for ICR mass spectrometers. The main contribution to the analysis time is the duration T of the acquired transient signal itself. The minimal T is determined by the desired resolving power R for ions of a specified mass-to-charge ratio value m/z having measured cyclotron frequency $\omega_+$:

$$T=4\pi R/\omega_+ \quad (1)$$

Since $\omega_+$ is proportional to the strength of the magnetic field B of ICR mass spectrometer, the minimal required transient duration T seems to be limited by the magnetic field B. To overcome this limitation, it was suggested in the 1980s to use multiple-electrode detection plate arrangements. In multiple-electrode arrangements, each of the detection electrodes is split into several smaller electrodes. These electrodes are connected to an amplifier of the image signal in such a way that the detection of the ion oscillation overtone frequencies is performed. The overtone frequencies typically occur on multiples of the ion cyclotron frequency $\omega_+$, i.e. the overtone frequencies have frequencies $M\omega_+$, where M is an integer. When the decoherence time of the ion cloud with excited coherent cyclotron motion exceeds a duration of the acquired transient T, the multiple-electrode cell gives the improvement M in the obtained resolving power predicted by Eqn. (1). Alternatively, the same resolving power R is obtained with M times shorter transient.

A number of multiple-electrode cell designs have been suggested. Their common drawback is the reduced sensitivity compared to the conventional cell designs. To obtain the same sensitivity, the ion cyclotron radius in a multiple-electrode cell has to be larger for larger values of the frequency multiple M. Excitation of ions to the orbits larger than half of the cell radius is not always a desirable condition in ICR experiments. Among the reasons for this undesirability are 1) deviation of the trapping potential from the quadrupolar form in cylindrical and cubic cells at large radii and 2) possible dephasing of the ion cloud during excitation to large orbits. For a given radius r of excitation in a conventional cell with one pair of detection electrodes and a multiple-electrode cell of the same radius R having M pairs of detection electrodes, the intensity of the signal obtained in the latter cell is $(r/R)^{M-1}$ times the intensity in the former one. Given that $r/R<1$, the difference in signal intensities is considerable at a small excitation radii.

An "O-trap" design (known in the art) addressed the speed of analysis issue in FTICR mass spectrometry in general and the sensitivity issues of the conventional multiple-electrode FTICR cells in particular. The "O-trap" concept includes separating the functions of ion excitation and detection between two different FTICR cell compartments. The "detection" compartment of the "O-trap" (where detection of the ion motion is performed) implements additional internal coaxial electrodes around which ions with excited cyclotron motion revolve. The separation of excitation and detection functions facilitates implementation of versatile techniques unattainable in a single compartment of a conventional FTICR cell (including prior-art multiple-electrode cells).

The following references (incorporated by reference herein in their entirety) describe this background technology:

1. Marshall A. G., Hendrickson C. L., Jackson G. S.; Mass Spectrom. Rev. 1998; 17: 1.
2. Amster J.; J. Mass Spectrom. 1996; 31: 1325.
3. Nikolaev E. N., et al.; USSR Inventor's Certificate SU1307492, 1985.
4. Nikolaev E. N., et al.; USSR Inventor's Certificate SU1683841, 1989.
5. Nikolaev E. N., et al.; Rapid Commun. Mass Spectrom. 1990; 4: 144-146.
6. Rockwood A., et al.; U.S. Pat. No. 4,990,775, 1991.
7. Pan Y., Ridge D. P., Rockwood A. L.; Int. J. Mass Spectrom. Ion Processes 1988; 84: 293.
8. Misharin A. S., Zubarev R. A.; Proc. 54th ASMS Conference, Seattle, Wash., 2006, Session: Instrumentation—FTMS—210.
9. Misharin A. S., Zubarev R. A.; Rapid Commun. Mass Spectrom. 2006; 20: 3223-3228.
10. Knobeler M., Wanczek K. P.; *Proc. of the 45th ASMS conference*, Palm Springs, Calif., 1997; p. 864.
11. Kaiser N. K., Bruce J. E.; International Journal of Mass Spectrometry 2007; 265(2-3): 271-280.
12. Weisbrod C. R., et al.; Anal. Chem. 2008; 80(17): 6545-6553.
13. Kim S., et al.; Anal. Chem. 2007; 79(10): 3575-3580.
14. Caravatti P., Allemann M.; Org. Mass Spectrom. 1991; 26: 514-518.
15. Lammert S. A., et al.; International Journal of Mass Spectrometry 2001; 212(1-3): 25-40.
16. Lammert S. A. et al.; J. Am. Soc. Mass Spectrom. 2006; 17: 916-922.
17. Tolmachev A. V., et al.; J. Am. Soc. Mass Spectrom. 2008; 19(4): 586-597.
18. Brustkern A. M. et al.; J. Am. Soc. Mass Spectrom. 2008; 19: 1281-1285.
20. Gorshkov M. V., Paša-Tolić L., Bruce J. E., Anderson G. A., Smith R. D. Anal. Chem. 1997, 69, 1307-1314
21. McIver R. T. et al.; International Journal of Mass Spectrometry and Ion Processes 1985 (64), 67.
22. M. V. Gorshkov et al., Journal of the American Society for Mass Spectrometry, 2001 (12), 1169.
23. Guan S., Marshall A. G. International Journal of Mass Spectrometry and Ion Processes 1995, 146/147: 261-296.
24. Misharin A. S., Zubarev R. A., Doroshenko V. M., In: Proc. 57th ASMS Conference, Philadelphia, Pa., 2009, Session: Instrumentation—FTMS—285

SUMMARY OF THE INVENTION

In one embodiment of the invention, there is provided a method of operating a measuring cell of an ICR mass spectrometer, the cell having a first compartment and a second compartment positioned spatially along a direction of a magnetic field of said mass spectrometer. The method includes trapping ions in the first compartment of the ICR mass spectrometer by generating an electric potential well in the direction of the magnetic field with a minimum of the electric potential well substantially located inside the first compartment. The method includes exciting cyclotron motion of the ions trapped in the first compartment, and transferring at least a part of the excited ions from the first compartment to the second compartment by displacement of a position of the minimum of the electric potential well from the first compartment to the second compartment. The method includes detecting ion cyclotron motion of at least a part of the ions in the second compartment. In this method, the ions are transferred by displacing the position of the minimum of the electric potential well from the first compartment to the second compartment over a period of time longer than a characteristic period of ion oscillations along the direction of the magnetic field in the electric potential well.

In another embodiment of the invention, there is provided an ICR mass spectrometer including a first compartment positioned spatially along a direction of a magnetic field of the mass spectrometer and a second compartment positioned spatially along the direction of the magnetic field. The first and second compartments have corresponding electrodes and a common electrode shared between the first and second compartments. The ICR mass spectrometer includes an ion trapping device in the first compartment. The ion trapping device is configured to trap ions in the first compartment by establishment of an electric potential well in the direction of the magnetic field with a position of a minimum of said electric potential well located inside the first compartment. The ICR mass spectrometer includes an ion excitation device configured to excite cyclotron motion of the ions trapped in the first compartment, and includes a transfer device configured to transfer at least a part of the excited ions from the first compartment to the second compartment by displacement of the position of the minimum of the electric potential well toward the second compartment. The ions are transferred by displacing the position of the minimum of the electric potential well from the first compartment to the second compartment over a period of time longer than a characteristic period of ion oscillations along the direction of the magnetic field in the electric potential well. The ICR mass spectrometer includes a detector for detecting ion cyclotron motion of at least a part of the ions in the second compartment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 7A-1 and 7A-2 are schematics of 1) the detection of ions in the "O-trap" cell in both "excitation" and "detection" compartments simultaneously and 2) the voltage configuration thereof;

FIGS. 7B-1 and 7B-2 are schematics of 1) the detection of ions in the "O-trap" cell in the "excitation" compartment only and 2) the voltage configuration thereof;

FIGS. 7C-1 and 7C-2 are schematics of 1) the detection of ions in the "O-trap" cell in the "detection" compartment only and 2) the voltage configuration thereof.

DETAIL DESCRIPTION OF THE INVENTION

Figure 1:
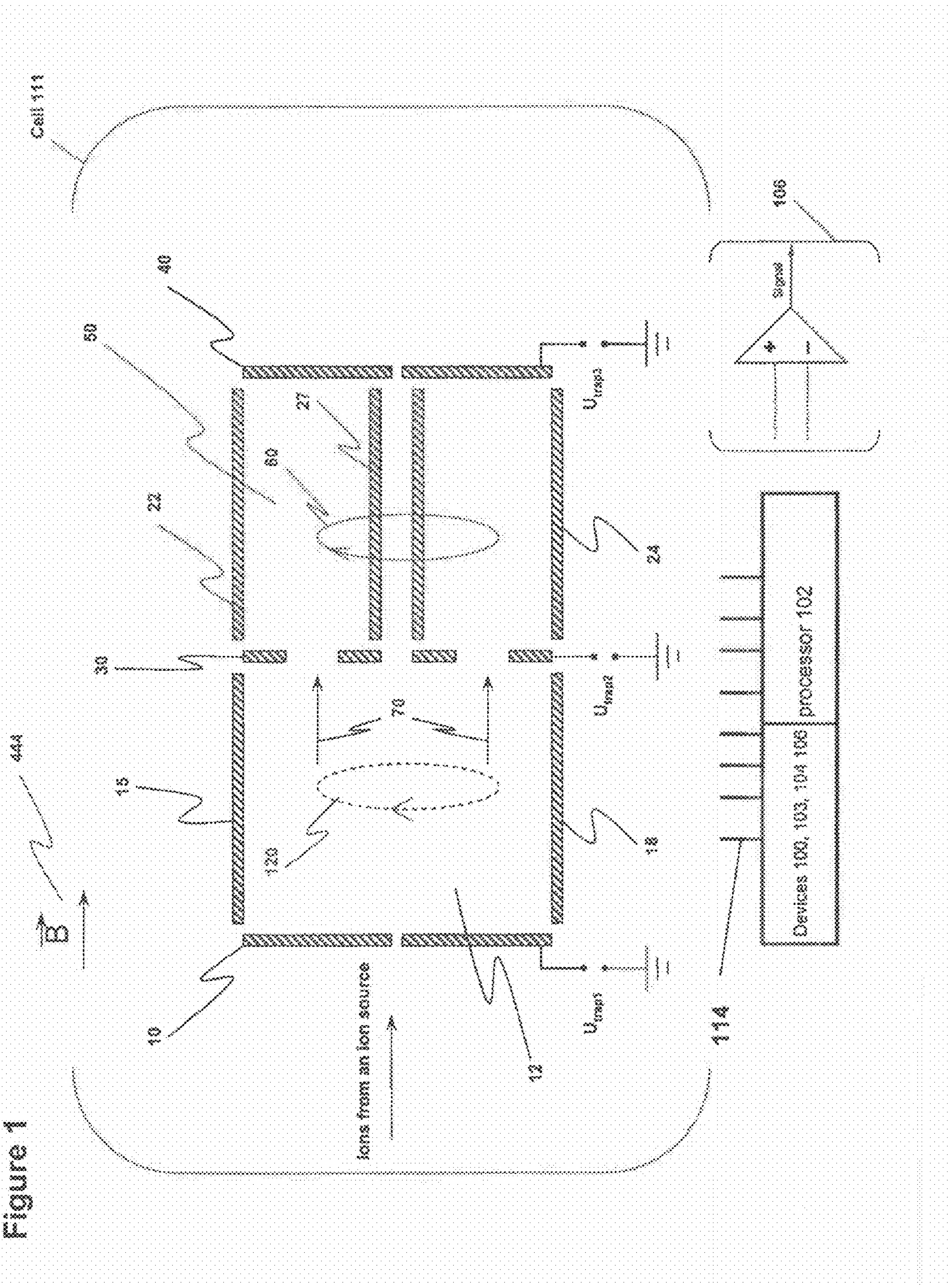
FIG. 1 is a schematic cross sectional view of an "O-trap"-geometry FT-ICR cell according to the one embodiment of the present invention.

Mass measurement principles based on detection of the ion oscillation overtone frequencies (also termed "multiples" of the fundamental frequency) in ICR have been known and studied. Workers have investigated detection on the second and fourth multiples of the fundamental frequency and have demonstrated the increase of the resolving power in proportion to the order of the frequency multiple. Such work has indicated the possibility to reduce the data acquisition time required to obtain a certain resolution by detection of the frequency multiples and has noted the importance of this possibility for high repetition rate experiments, especially in conjunction with on-line liquid chromatography (LC) separations.

Useful aspects of the "O-trap" FT-ICR cell design included separation of the excitation and detection functions between different ICR cell compartments and utilization of the internal coaxial (detection) electrodes in the "detection compartment" of the cell around which ions with the excited coherent cyclotron motion revolve after transfer from the "excitation" compartment where excitation of their cyclotron motion takes place.

Utilization of the internal coaxial detection electrodes in the "detection" compartment leads to the increase of the detected signal amplitude compared to a conventional cell of the same outer diameter and the same radii of the ion motion in both cells. The increase is achieved because all electrodes in the detection compartment are used for detection, and because detection electrodes connected to the different inputs of the signal preamplifier are more screened form each other by the inner electrodes of the compartment compared to the case of detection electrodes in conventional cells where essentially no screening exists. Another distinguishing feature of the "O-trap" cell that further enhances its detection sensitivity is discussed below.

Utilization of the inner electrodes around which ions with the excited cyclotron motion revolve in the "detection" compartment makes it possible to manipulate the trapping electric field between these electrodes and the outer electrodes of the "detection" compartment. Radial component $E_r$ (of the trapping electric field between the coaxial electrodes of the "detection" compartment) changes its sign at a certain surface between the electrodes (located at the "zero-field" radius of the ion motion) and, consequently, becomes zero at that surface. Therefore, ions having sufficiently low amplitudes of their axial oscillations and revolving around the inner electrodes of the "detection" compartment in the vicinity of that surface will experience relatively small shifts of their cyclotron frequency due to the radial component of the electric field. Corrections of the trapping electric potential that lead to a reduced (and approximately constant over a range of axial coordinates) radial component of the trapping electric field at some radius of the ion motion have been demonstrated using a beam of low-energy electrons, using segmented trapping electrodes of a "trapping ring electrode" cell (TREC), and utilizing negative biases on a "sidekick" electrode of an "infinity" cell during detection.

Further, using appropriate electrode configuration, the electric field in the detection compartment of the "O-trap" cell can be made a close approximation to the ideal quadrupolar one in a certain range of the axial and radial coordinates close to the surface indicated above. This can be achieved, for example, when the detection compartment is obtained by rotation of a hyperbolic Penning trap on an edge through space (with appropriate correction of the electrode shape to compensate for the distortions to the quadrupolar trapping field introduced by the curvature of the trapping region and slits in the trapping electrodes made for ion introduction into the volume of the detection compartment), similar to the case of the "toroidal" radiofrequency ion traps. Ions with the excited cyclotron motion will revolve in this, close to the ideal quadrupolar, electric field around the inner electrodes of the detection compartment.

In other words, the trapping electric field of the "detection" compartment can closely approximate the ideal quadrupolar one at the radius of the excited ion cyclotron motion. This is different from any conventional FTICR cell in which electric field close to the ideal quadrupolar one exists only near the cells' center and ions leave this region after excitation of their cyclotron motion. The closer the ion orbit comes to the detection electrodes in any conventional FTICR cell, the larger the deviation of the trapping potential from the ideal quadrupolar one. Such deviation generally deleteriously affects duration of the signal transient, dynamic range, mass resolution and accuracy of the acquired spectra.

On the contrary, ion trajectory in the "O-trap" detection compartment can closely approach the coaxial detection electrodes while ions still move in a close to an ideal electric potential. This further enhances detection sensitivity in the "O-trap." As indicated above, the need for ions to come closer to the detection electrodes becomes more significant with the increase of the frequency multiplication order M of the overtone detection schemes (the scheme of the order M typically uses 2M detection electrodes) because in that case (for conventional multiple-electrode cells) amplitude of the detected signal changes proportionally to the $(r/R)^M$ with the order M of frequency multiplication where r is the radius of the ion motion, and R is the radius of the cell.

The above-noted approximation to the ideal trapping field can be achieved, of course, when detection electrodes occupy surfaces other than (coaxial) 'hyperbolic' ones. For example, in the case of the conventional cylindrical FTICR cells, optimization of the number and size of the cell electrodes as well as the distance between electrodes of the cell, and voltages applied across the electrodes with respect to a certain figure of merit has been demonstrated to result in increased resolving power and mass measurement accuracy and smaller dependence of these parameters on the amplitudes of the ion radial and axial motions.

At another extreme, the electric potential in the "detection" compartment of the "O-trap" cell can be made close to the idealized "particle in a box" one for which potential is non-zero at the ends of the trapping volume only. This case can be realized when the length of the detection compartment is (significantly) larger than the gap between the coaxial electrodes. In this case, ions will not (to a great extent) experience shifts of their cyclotron frequency at the central part of the "detection" compartment because the trapping electric field does not penetrate there. At the ends of the trapping volume, however, the trapping field is non-zero, and ions will experience radial component of the trapping field if radius of their cyclotron motion is different from the "zero-field" one indicated above.

However, despite the advances of the O-trap design, this invention was made under the realization that, under the conditions that ion transfer should take place in (generally) inhomogeneous magnetic field and that deviations of the trapping potential from quadrupolar shape during ion transfer process tend to disrupt the coherent ion motion. Successful implementation of ion transfer between compartments of the "O-trap" is a key milestone in the development of the whole O-trap concept, including the ability to increase resolving power (achieved over a certain period of time) by performing detection of the overtone frequencies after (and/or in the course of) the ion transfer process.

In the "O-trap" FT-ICR cell configuration, according to one embodiment of the invention, the functions of ion excitation and detection are separated between two or more different FT-ICR cell compartments. At least one of the compartments where detection of the ion motion takes place (termed "detection compartment" or "detection cell") has preferentially the "O-trap" geometry described in detail below.

An FT-ICR cell with the "O-trap" geometry ("O-trap"-geometry cell) has internal coaxial electrodes around which ions with excited cyclotron motion revolve. Typically, "O-trap"-geometry cells are used exclusively for detection of the ion cyclotron motion which was excited in another cell ("excitation cell" or "excitation compartment") which generally can be of a conventional or other-than-"O-trap" design.

One feature which distinguishes the "O-trap" FT-ICR cell configuration from any other FT-ICR cell configuration such as the "dual cell" configuration is that ion transfer between the "excitation" and "detection" compartments of the "O-trap" FTICR cell is performed after excitation of the coherent ion cyclotron motion.

In the "O-trap" FT-ICR cell configuration, the compartment where excitation of the ion motion takes place (the "excitation" compartment) can also have its own auxiliary means for detection of the ion motion. Whenever the terms "O-trap", "O-trap FT-ICR cell", "O-trap ICR cell" or "O-trap cell" are used herein, this usage refers to those ICR cell configuration in which functions of the ion excitation and detection are separated between different compartments, and at least one of the compartments where detection of the ion motion takes place has preferentially (although not necessary) the "O-trap" geometry.

In one embodiment of the invention, a mode of operation of the novel ICR measuring cell (termed "O-trap") is provided where ion transfer between compartments can occur without increasing the translational energy and/or the translational energy spread ("translational temperature") of their oscillations along the direction of the magnetic field of an ICR mass spectrometer and can occur without desynchronization (dephasing) of their coherent cyclotron motion.

In many different mass spectrometric techniques and applications, the energy and energy spread of the charged particles in use, such as ions or electrons, need to be as small as possible.

In ICR mass spectrometry, translational energy as well as the spread of the translational energy within the ion population trapped in a measuring cell related to axial oscillations along the direction of the magnetic field needs to be minimal in order to achieve high resolution and high accuracy mass measurements. This requirement arises due to the fact that both mass accuracy and resolving power generally depend upon the homogeneity of the magnetic field and quality of the electric field of the ICR measuring cell. However, a desirable highly homogeneous magnetic field and a desirably shaped electric field (often quadrupolar) are typically obtained only in a spatially limited volume inside the cell. Thus, it is desirable that the trapped ions be confined in that region. To fulfill this requirement, the translational energy of the ions related to their axial oscillations must be small, often of the order of a fraction of an electron volt of energy.

Previous methods of the ion transfer used in ICR mass spectrometry can generally be described as "throw-and-catch" methods. The common feature of these methods is that ions leaving the "source" device from where they are transferred (for example, accumulation octopole of an ICR mass spectrometer, or the "excitation" compartment of the "O-trap" cell) are generally given some (significant) amount of translational energy in order to propel those ions towards the "destination" device where the ions are transferred to (for example, an ICR measuring cell or "detection" compartment of the "O-trap" ICR cell configuration). Such an ion transfer process which involves imparting translation energy to the ion population being transferred as well as the conventional methods of "catching" (or trapping) the ions in the destination device (such as the "gated trapping" method) generally lead to the increase of the translational energy spread within the transferred ion population.

Because ions of different mass-to-charge ratios (m/z) are typically given (on average) the same amount of translational energy in the source device, these ions arrive to the destination device (for example, the "detection" compartment of the "O-trap" ICR cell) at different times. This so-called "time-of-flight" effect adversely affects the m/z range of the simultaneously trapped ions and the linearity of the ion abundance measurements.

Further, for ions of certain m/z values, the time of the potential rise across the trapping electrodes of the "detection" compartment of the "O-trap" ICR cell (final step of the "gated trapping" method) is not optimal because these ions are too close to the trapping electrodes at the time of the potential rise and hence get a "push" from these electrodes, thus acquiring excessive energy (and spread of that energy) of their oscillations along the cell axis (generally parallel to the direction of the magnetic field) that needs to be subsequently removed in order to obtain high quality mass measurements.

For removing excessive translational energy of the trapped ions in ICR cells, different cooling methods are used in practice. For example, ion translational energy and "translational temperature" can be reduced in collisions with background gas in the cell ("collisional cooling" method), or the ion translational energy can be decreased by changing configuration of the potential trapping well in the cell in the so-called "adiabatic cooling" method.

Unfortunately, these conventional cooling methods (i.e., collisional cooling; adiabatic cooling) can not be implemented with the "O-trap" ICR cell because these methods either lead to desynchronization of the coherent ion cyclotron motion (collisional cooling) or take too much time to achieve (adiabatic cooling).

The so-called "evaporative" method of lowering the translational temperature of the ion ensemble in the cell is based on allowing ions with excessive amount of the translational energy to leave the cell. This is done by lowering the trapping potentials of the cell. The drawback of this cooling method is the associated ion losses from the cell that lead to the decrease in the sensitivity of the measurements.

In one embodiment of the invention, there is provided a method of the "O-trap" ICR cell operation including ion transfer between its compartments after excitation of the coherent ion cyclotron motion that would be free of the adverse effects of the "throw-and-catch" methods of ion transfer currently utilized in ICR mass spectrometry (the abovementioned time-of-flight effect and the increase of the ion "translational temperature"). In one aspect of the invention, the method avoids significant desynchronization of the ion cloud. In one aspect of the invention, the method avoids a significant increase of its spatial spread, and ion losses in the course of the ion transfer process between the "O-trap" cell compartments.

Accordingly, in one embodiment of the invention, there is provided a novel method of operating a measuring cell of an ICR mass spectrometer, the cell having at least two compartments positioned spatially along a direction of a magnetic field of the mass spectrometer, where each compartment includes corresponding electrodes. The method includes trapping ions in a first compartment of the cell of the ICR mass spectrometer by generating an electric potential well in the direction of the magnetic field with a minimum of the electric potential well substantially located inside the first compartment. The method includes exciting cyclotron motion of the ions trapped in the first compartment, and transferring at least a part of the excited ions from the first compartment to a second compartment of the cell. More specifically, ions are excited in the first compartment and then transferred to the second compartment of the cell by a gradual displacement of the minimum of the electric potential well from the first compartment to the second compartment. The displacement occurs preferably over a period of time equal to or longer than a characteristic period of ion oscillations along the direction of the magnetic field in said electric potential well. The method includes detecting an ion cyclotron motion of at least a part of the ions in the second compartment.

General details of the ion detection schemes utilized in conventional ICR cells, multiple-electrode ICR cell, and the "O-trap" FTICR cell are described in the cross-referenced patent application noted above.

In the course of the ion transfer process, according to the method of ICR cell operation described above, ions remain essentially trapped and spatially confined in the said potential well and said ion transfer process occurs sufficiently slowly, in a quasi-adiabatic manner, for the ions to essentially preserve their translational temperature. One consideration in this method of ion transfer, as noted above, is that the transfer duration which should be longer than a characteristic period of oscillations along the direction of the magnetic field for ions confined in the electric potential well. This is equivalent to a requirement that the velocity of the displacement of the minimum of the potential well should not exceed characteristic velocity of the oscillating ions confined in the well. This consideration serves to prevent the translational temperature of the ion cloud to be significantly changed in the course of the transfer process.

The characteristic period of oscillations for ions confined in the trapping potential well can be estimated as $$T \approx L\sqrt{\frac{m}{2zU}} \tag{2}$$

Where L is a characteristic spatial extent of the potential well (along which ions can oscillate), m/z is the ion mass-to-charge ratio, and U is the potential well depth.

The characteristic velocity of the particle motion in the well $V_0$ is thus can be estimated as $$V_0 = \sqrt{\frac{2zU}{m}}. \tag{3}$$

If ions of different m/z ratios are confined within the potential well, the duration of the potential well displacement should be compared to the characteristic period of oscillations of ions with the largest m/z value. Further, the velocity of the well displacement should be compared with the characteristic velocity of these ions in the potential well.

To make an estimation of the energy increase of the ion oscillations during the ion transfer from one cell to another, consider a simple one-dimensional model of the trapping potential well with vertical walls ("particle in a box") which nevertheless has all important characteristics in order to make general conclusions. For simplicity, the potential well acquires its velocity $V_{well}$ "instantly" (i.e. during time much less then the shortest period of the ion oscillations in the well). Assume that during transfer all ions perform more than one oscillation in the well.

Before the well starts moving, the average energy of the ion oscillations in it, $<\epsilon>$, is related to the "translational temperature" $T_0$ of the ions:

$$<\epsilon>=kT_0 \tag{4},$$

where k is the Boltzmann constant. This energy can be related to the characteristic velocity of the particle motion in the well $V_0$:

$$kT_0=mV_0^2/2 \tag{5},$$

where m is the ion mass. When the well moves with the velocity $V_{well}$, the average increase of the translational energy of an ion in it is $mV_{well}^2/2$, i.e.

$$\Delta E=mV_{well}^2/2 \tag{6}.$$

If all this excessive energy remains in the ion cloud after the end of the transfer, then $$\Delta E=k(T_1-T_0)=k\Delta T \tag{7}$$

where $T_1$ is the translational temperature of the ions after the transfer, and ΔT is the temperature increase as a result of the transfer. When $V_{well}$ is much less than $V_0$, the value of ΔE is small compared to the value of $kT_0$, and thus the temperature increase ΔT in formula (7) is small compared to the initial "translational temperature" of the trapped ions.

Consider ions with m/z 2000 (e.g., the slowest ions in a standard mode of operation of many conventional ICR mass spectrometers) oscillating with the energy of 0.1 eV per charge along the main axis of an ICR cell. The maximum ion velocity during these oscillations is ca. 100 m/s. Transfer of these ions from one compartment of the ICR cell to another, according to one embodiment of the present invention, requires $V_{well}$ to be (much) less than 100 m/s. The well velocity of 10 m/s is sufficient to transfer the ions on a 6 cm distance between the compartments in 6 ms. This is a reasonable transfer time given the typical FTICR times of ion excitation (milliseconds) and a 1-10 ms delay after ion excitation to finish all transient processes before ion detection starts. The temperature increase after such transfer according to formulae (4-7) would be negligible.

Radial ion motion in an ideal three-dimensional quadrupolar trapping potential does not depend on the axial motion of an ion. Therefore, the coherence of the cyclotron motion of an ion ensemble in a displacing ideal quadrupolar potential will be largely conserved. In actuality, some dephasing is expected due to deviations from the quadrupolar potential. In a non-ideal potential, ions having different axial energies will experience different phase shifts of their cyclotron motion during axial oscillations because of the different average radial component of the electric field which the ions experience over one period of the axial oscillations. This would lead to the loss of the phase coherence of the ion packet.

In one embodiment, ion transfer between compartments avoids the ion cloud expansion and avoids ion losses during ion transfer from one compartment of the "O-trap" ICR cell ("excitation" compartment) to another compartment (second, "detection" compartment) because the ions are all the time confined within the limits of the potential well. When the minimum of the well is inside the second compartment of the "O-trap" cell and the well confines ions within that compartment, the transfer process is finished without loss of the ions and without an increase of their translational temperature. Because all ions irrespective of their m/z values are confined within the limits of the potential well all the time of the transfer, the transferred ions will arrive at the destination compartment essentially at the same time.

The capability to perform ion transfer between the compartments of the "O-trap" FTICR cell without significant desynchronization of the coherent ion cyclotron motion according to the principles of the ion transfer disclosed above has been successfully demonstrated using one of the possible implementations of the "O-trap" FTICR cell operation mode described below.

Referring now to the drawings, wherein like reference numerals designate identical, or corresponding parts throughout the several views, and more particularly to FIG. 1, FIG. 1 is a schematic cross sectional view of an "O-trap"-geometry FT-ICR cell according to one embodiment of the invention. As shown in FIG. 1, the two-compartment ICR cell configuration has, in this embodiment, one of the compartments, compartment 50, with the "O-trap" geometry and the other compartment, compartment 12, of a conventional geometry. FIG. 1 shows the arrangement of electrodes by a cross-sectional view of the cell by a plane containing the magnetic field axis (arrow 444, FIG. 1).

In operation, cell 111 in FIG. 1 is placed preferably but not necessarily in a uniform magnetic field B and is enclosed within an evacuated chamber or envelope (not shown). Cell 111 has two compartments. Electrodes 10, 15, and 18 belong to the compartment 12 of the cell 111 where excitation of the ion cyclotron motion takes place ("excitation" compartment"). Electrodes 22, 24, 27, and 40 belong to the "O-trap"-geometry compartment 50 which can be utilized (exclusively in some embodiments) for detection of the ion cyclotron motion ("detection" compartment). As shown in FIG. 1, the "excitation" and "detection" compartment have a common electrode 30.

The "excitation" compartment 12 of the cell 111 can perform the typical functions of any conventional ICR cell such as ion trapping, excitation, detection, isolation, etc. The mode of operation of the cell 111 according to various embodiments of the present invention can generally be described as follows.

Ions to be analyzed are introduced into the volume of compartment 12 of cell 111 surrounded by the trapping electrodes 10 and 30, excitation electrodes 15 and 18, and detection electrodes (not shown) along the direction of the magnetic field B (arrow 444). This arrangement constitutes an ion injection configuration permitting an "ion injection" event (or "ion injection" time interval or, simply, "ion injection") to occur. Ion trapping in the volume of the "excitation" compartment 12 along the direction of the magnetic field B is typically done using DC potentials $U_{trap1}$ and $U_{trap2}$ applied across the "trapping" electrodes 10 and 30 respectively.

These electric potentials form a potential well along the direction of the magnetic field B with the minimum of that well residing inside the inner volume of the "excitation" compartment 12, thus keeping the ions within that volume. The trapping electrodes are typically positioned perpendicular to the direction of the magnetic field B and are located at both ends of the excitation and detection electrodes. The invention is not limited to this exact configuration of electrode geometry.

Figure 2:
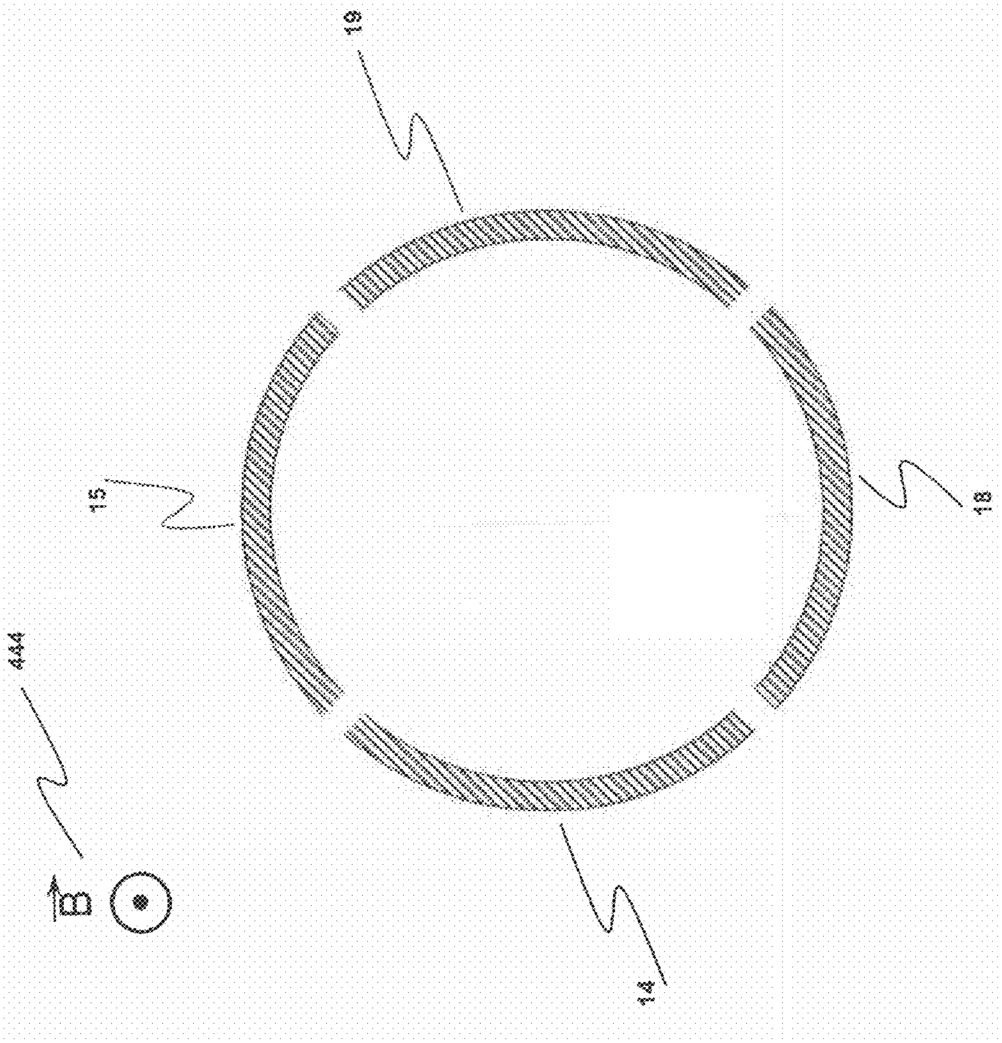
FIG. 2 is a schematic cross sectional view of an excitation compartment of an "O-trap" FT-ICR cell according to the one embodiment of the present invention.

FIG. 2 shows a cross sectional view of the excitation compartment with the excitation and detection electrodes. Similar to the excitation electrodes 15 and 18, detection electrodes 14, 19 of the "excitation" compartment 12 (see FIG. 2) are positioned generally along the direction of the magnetic field B, as indicated in FIG. 2 which shows a cross section of the excitation compartment of the cell 111 by a plane perpendicular to the direction of the magnetic field B (arrow 444, FIG. 2).

Ion injection is typically followed by an "ion cooling" event, followed by "ion excitation" and "ion detection" events. The "ion cooling" event serves to reduce excessive translational energy of the ion population trapped in the "excitation" compartment of the cell 111. As discussed above, a number of conventional ion cooling methods can be utilized for "ion cooling." During an "excitation" event, radiofrequency waveforms applied across the excitation electrodes 15 and 18 of the "excitation" compartment 12 of the cell 111 bring the ions confined in compartment 12 into synchronous cyclotron motion (as illustrated by the ion orbit 120 shown in FIG. 1). An arbitrary waveform generator (AWG) can be used to drive the ions into the synchronous cyclotron motion.

During the following "ion transfer" event (shown by arrows 70 in FIG. 1) at least a part of the ions excited during the excitation event in the first ("excitation") compartment 12 of the cell 111 is transferred from the compartment to another (second, "O-trap"-geometry "detection" compartment in this particular embodiment) compartment 50 of the cell 111. In one embodiment of the invention, the transfer occurs by gradual displacement of the minimum of the electric potential well (which confines the ions) with the minimum being displaced along the direction of the magnetic field such that the position of the minimum moves from the first compartment 12 to the second compartment 50 of the cell 111. In one embodiment, the displacement occurs over a period of time within a range of 1 to 100 characteristic periods of ion oscillations along the direction of the magnetic field in the electric potential well. In another embodiment, the displacement occurs over a period of time within a range of 100 to 10,000 characteristic periods of ion oscillations along the direction of the magnetic field in the electric potential well. In yet another embodiment, the displacement occurs over a period of time within a range of 10,000 to 1,000,000 characteristic periods of ion oscillations along the direction of the magnetic field in the electric potential well.

Figure 3:
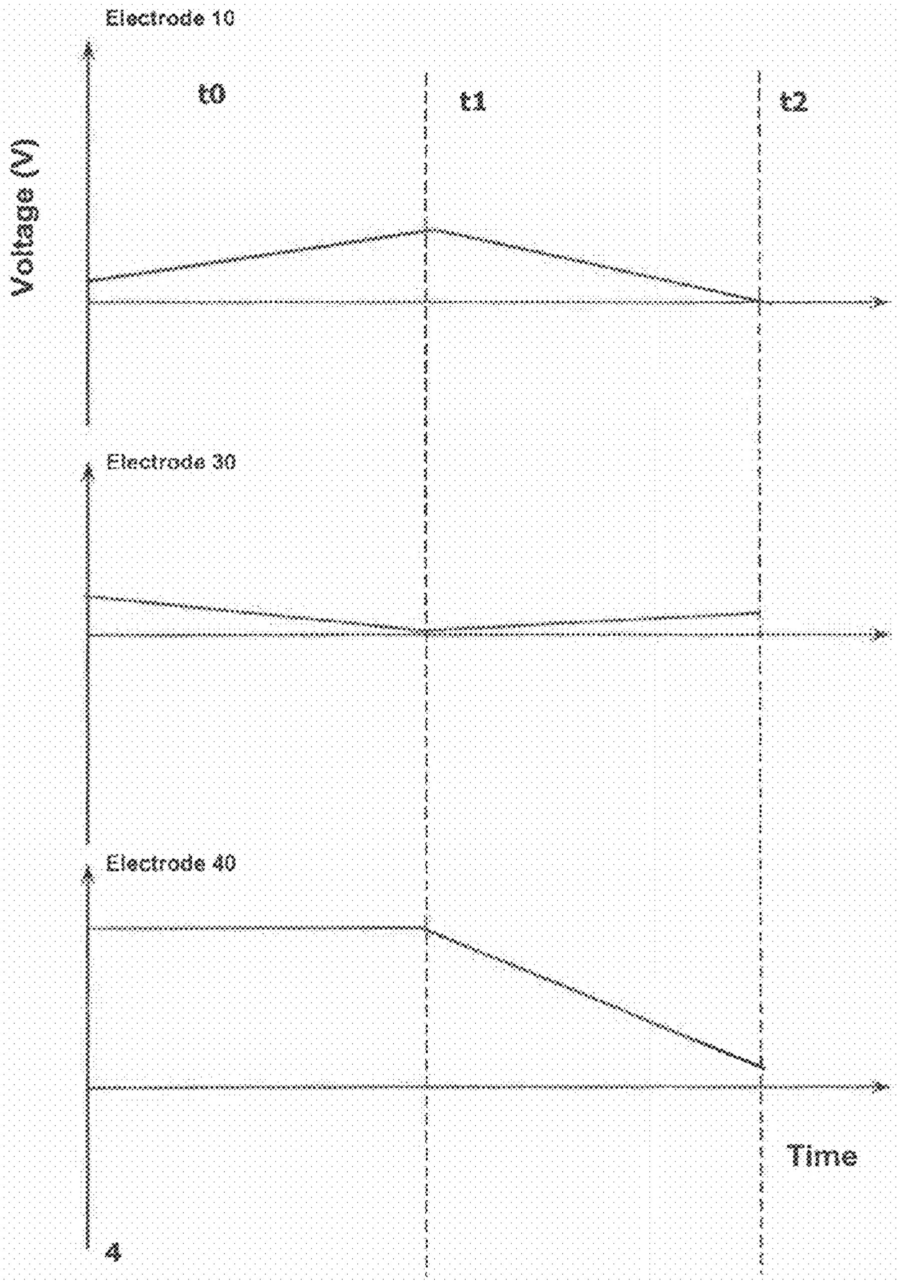
FIG. 3 is a schematic diagram of a voltage change across the electrodes of FIG. 1 during an ion transfer process according to the one embodiment of the present invention.

According to one embodiment of the invention, the electric potential well displacement during the "ion transfer" event is performed by applying linear voltage ramps across three electrodes (10, 30, and 40) of the cell 111 according to the time diagram shown in FIG. 3. FIG. 3 is a schematic diagram of a voltage change across the electrodes 10, 30, and 40 of the cell 111 of FIG. 1 during an ion transfer process according to the one embodiment of the invention.

According to the diagram shown in FIG. 3, the ion transfer process is split into two time intervals (generally, but not necessarily, of different durations). During the first part of these time intervals (between time points t0 and t1) the voltage applied across the electrode 10 of the cell 111 is increased while the voltage applied across the electrode 30 is decreased. The voltage applied to electrode 40 during the first of these time intervals is essentially constant. The purpose of this first part of the ion transfer process is to bring ions close to the electrode 30, which separates the "excitation" and "detection" compartments of the cell 111, while preferably permitting the ions to penetrate into the inner volume of the "detection" compartment 50. During the second part of the ion transfer process (between time points t1 and t2), the potential of (or the voltage applied to) electrode 10 is decreased, potentials of the electrodes 30 and 40 are increased and decreased respectively with the purpose of permitting the ions to move farther into the inner volume of the "detection" compartment 50 of the cell 111, and thereby trapping the transferred ions there. The trapping potential well, when inside the "detection" compartment 50 of the cell 111 is formed by electric potentials applied across the electrodes 30 and 40 of the cell 111. Ions trapped by the potential well in the "detection" compartment of the cell 111 revolve around its inner electrodes 27 as indicated by schematic depiction of the ion trajectory 60, shown in FIG. 1.

The "ion transfer" event is followed by detecting the ion cyclotron motion of at least part of the ions in compartment 50 of the cell 111. Details of the ion detection process in the "O-trap"-geometry "detection" compartment of the O-trap cell configuration and associated processing of the detected signal are described in the cross-referenced patent application noted above.

In one embodiment of the invention, the shape of the trapping electric potential well in the course of the ion transfer process can be noticeably different from an ideal quadrupolar shape because of the limited number of electrodes (three) used to create and displace the well and the simple linear shape of the potential ramps applied across those electrodes. In order to provide for a shape of the trapping potential well to be as close to the ideal quadrupolar one as possible, other embodiments of the present invention can be implemented which utilize different numbers, shapes and juxtapositions of the electrodes. Accordingly, in one embodiment of the invention, an "O-trap" FTICR cell configuration is used to create and displace the trapping potential well via more sophisticated (rather than linear) profiles of the voltage profile between electrodes during the ion transfer process.

Figure 4:
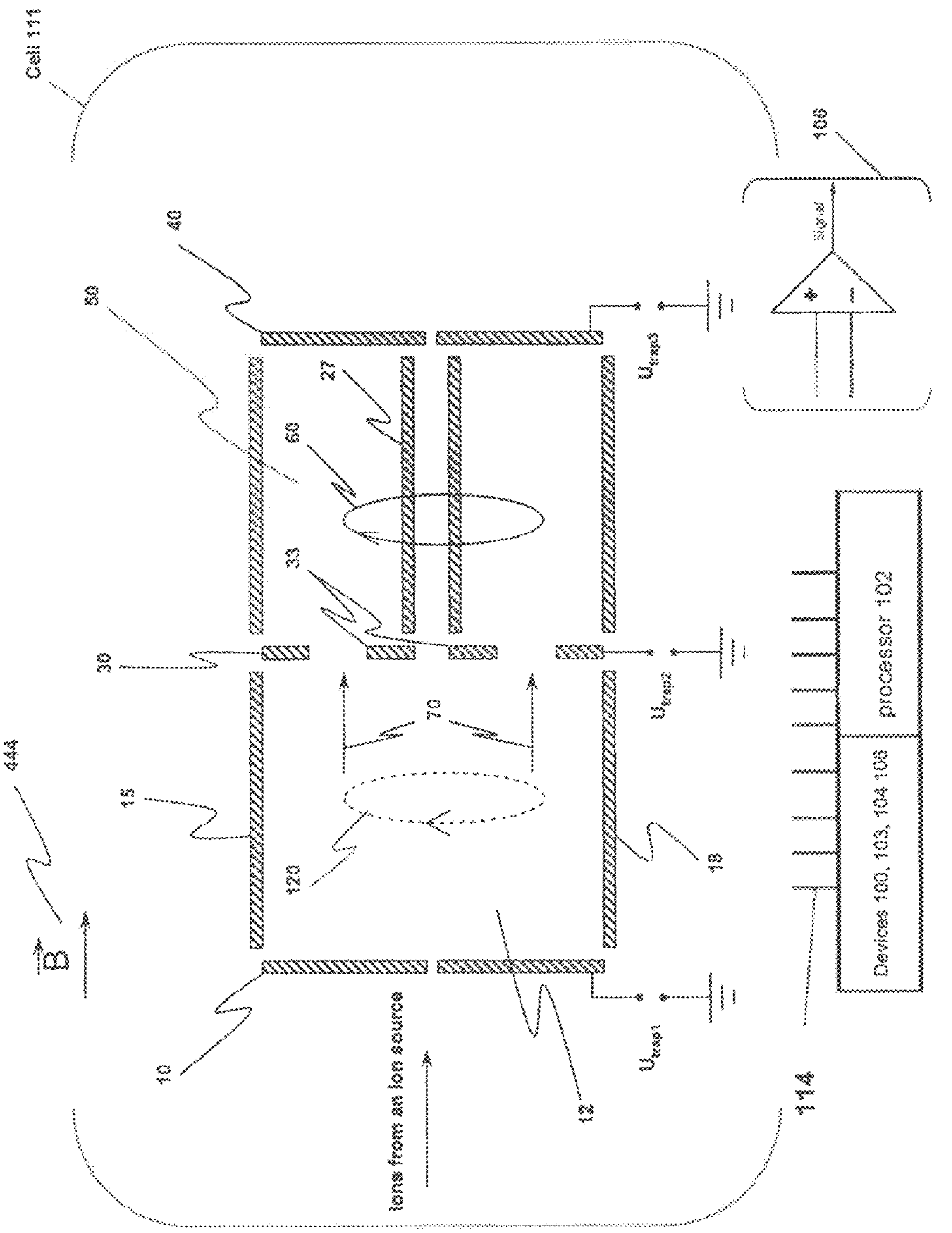
FIG. 4 is a schematic cross sectional view of an "O-trap"-geometry FT-ICR cell according to the one embodiment of the present invention.
Figure 5:
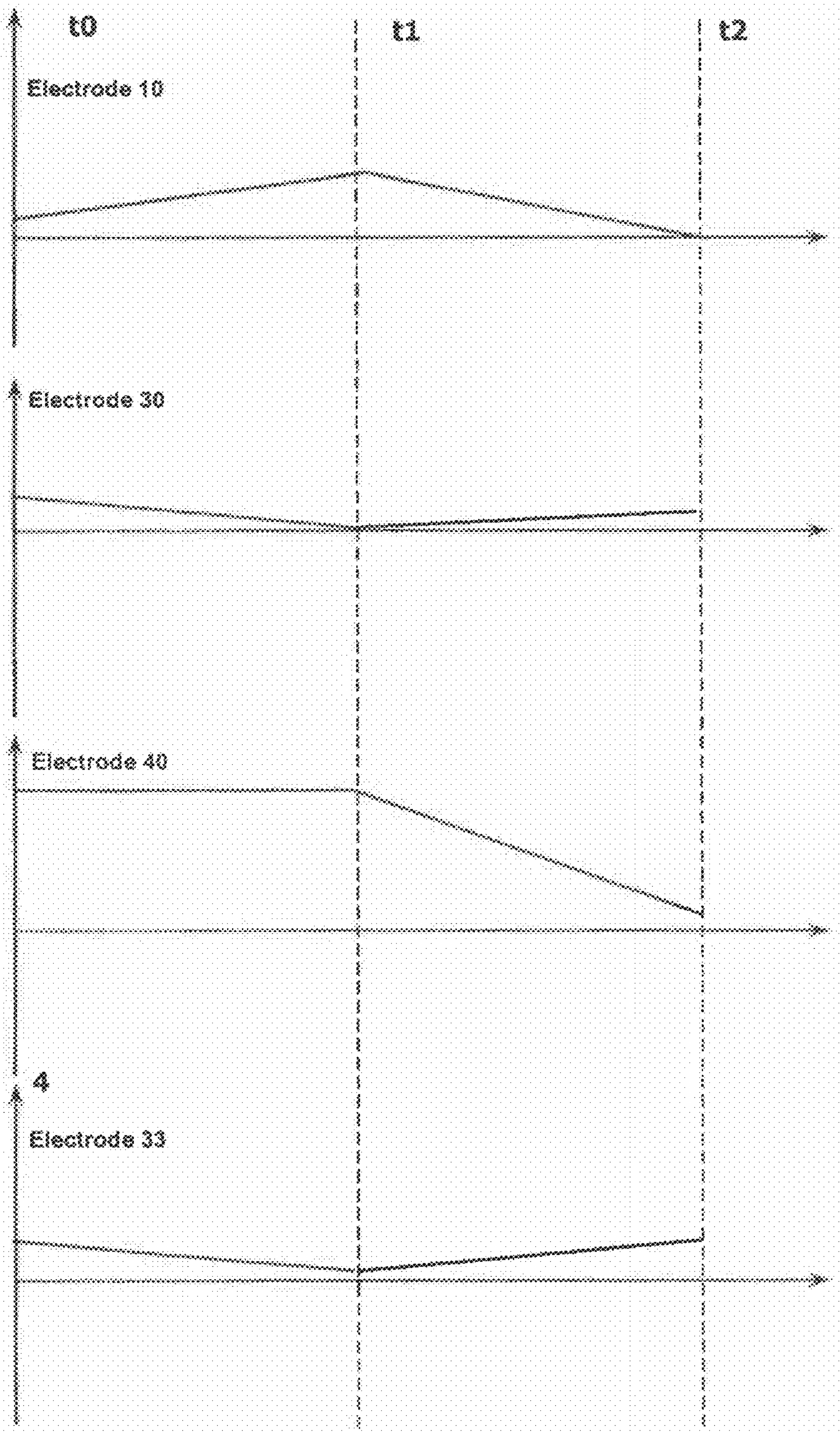
FIG. 5 is a schematic diagram of the voltage change across the electrodes of FIG. 4 during an ion transfer process according to the one embodiment of the present invention.

For example, FIG. 4 shows another embodiment of the present invention in which the central part of the electrode 30 of the cell 111 is utilized as an additional electrode 33 during the ion transfer process. The corresponding profiles of the voltage ramps applied across the electrodes 10, 30, 33, and 40 for the cell 111 in FIG. 4 is shown illustratively in FIG. 5. FIG. 5 is a schematic diagram of the voltage change across the electrodes of FIG. 4 during an ion transfer process according to the one embodiment of the present invention.

Figure 6:
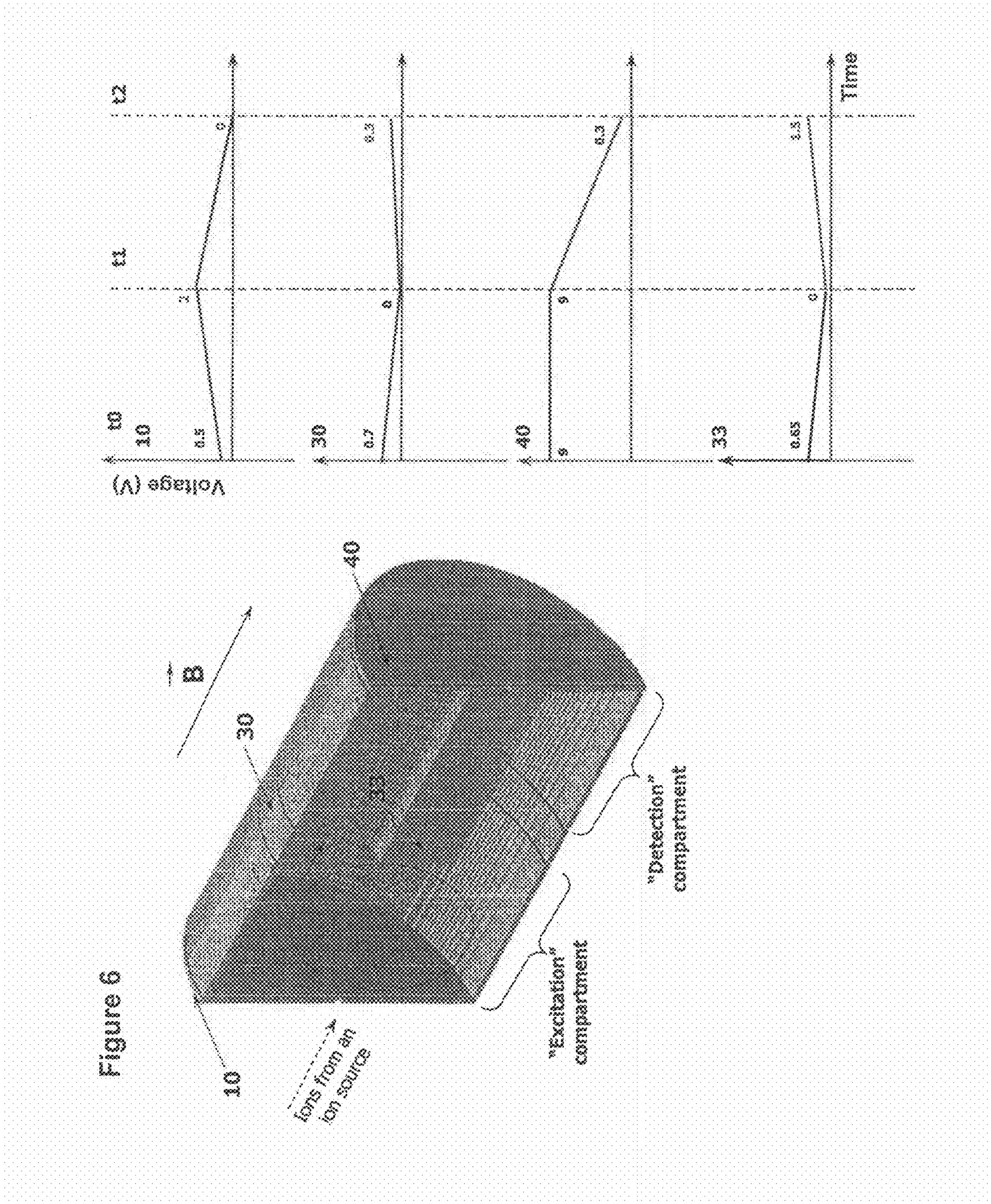
FIG. 6 is a schematic of a SIMION model of the "O-trap" FTICR cell configuration and is a schematic diagram of the voltage change across the electrodes during ion transfer between the "excitation" and "detection" compartments of the "O-trap" FTICR cell.

FIG. 6 shows a model of the implemented "O-trap" FTICR cell configuration (the model was created with a help of commercial software used to calculate electric fields and the trajectories of charged particles in those fields called SIMION (distributed by Scientific Instrument Services, Ringoes, N.J.)) and profiles of the voltage ramps applied across the electrodes 10, 30, 33, and 40 of the cell during ion transfer between its "excitation" and "detection" compartments. In the demonstrated implementation of the ion transfer process according to the present invention between the "excitation" and "detection" compartments of the "O-trap" cell (shown in FIG. 5), doubly-charged ions of bradykinin peptide (m/z 530) were successfully transferred over the distance of ca. 2.5 cm in the magnetic field of a 5 T magnet with ca. 100 ppm homogeneity over the ion transfer distance. The duration of ion transfer was about 10 ms.

To confirm the simulations and prove that ion transfer is realized, experiments were performed which demonstrated that ions can be selectively trapped and detected either in the "excitation" or "detection" compartment of the "O-trap" FT-ICR cell or both these compartments simultaneously.

The schematics in the FIG. 7 series show (in general) the corresponding spectra along with the indication of the trapping potentials applied across electrodes of the cell after the end of the ion transfer process. FIGS. 7A-1 and 7A-2 are schematics of 1) the detection of ions in the "O-trap" cell in both "excitation" and "detection" compartments simultaneously and 2) the voltage configuration thereof. FIGS. 7B-1 and 7B-2 are schematics of 1) the detection of ions in the "O-trap" cell in the "excitation" compartment only and 2) the voltage configuration thereof FIGS. 7C-1 and 7C-2 are schematics of 1) the detection of ions in the "O-trap" cell in the "detection" compartment only and 2) the voltage configuration thereof The same preamplifier was connected to the detection electrodes of both compartments simultaneously. The experiments were performed with doubly charged bradykinin ions. The spectra are shown in the frequency vs. intensity coordinates.

Figures 1, 7A:
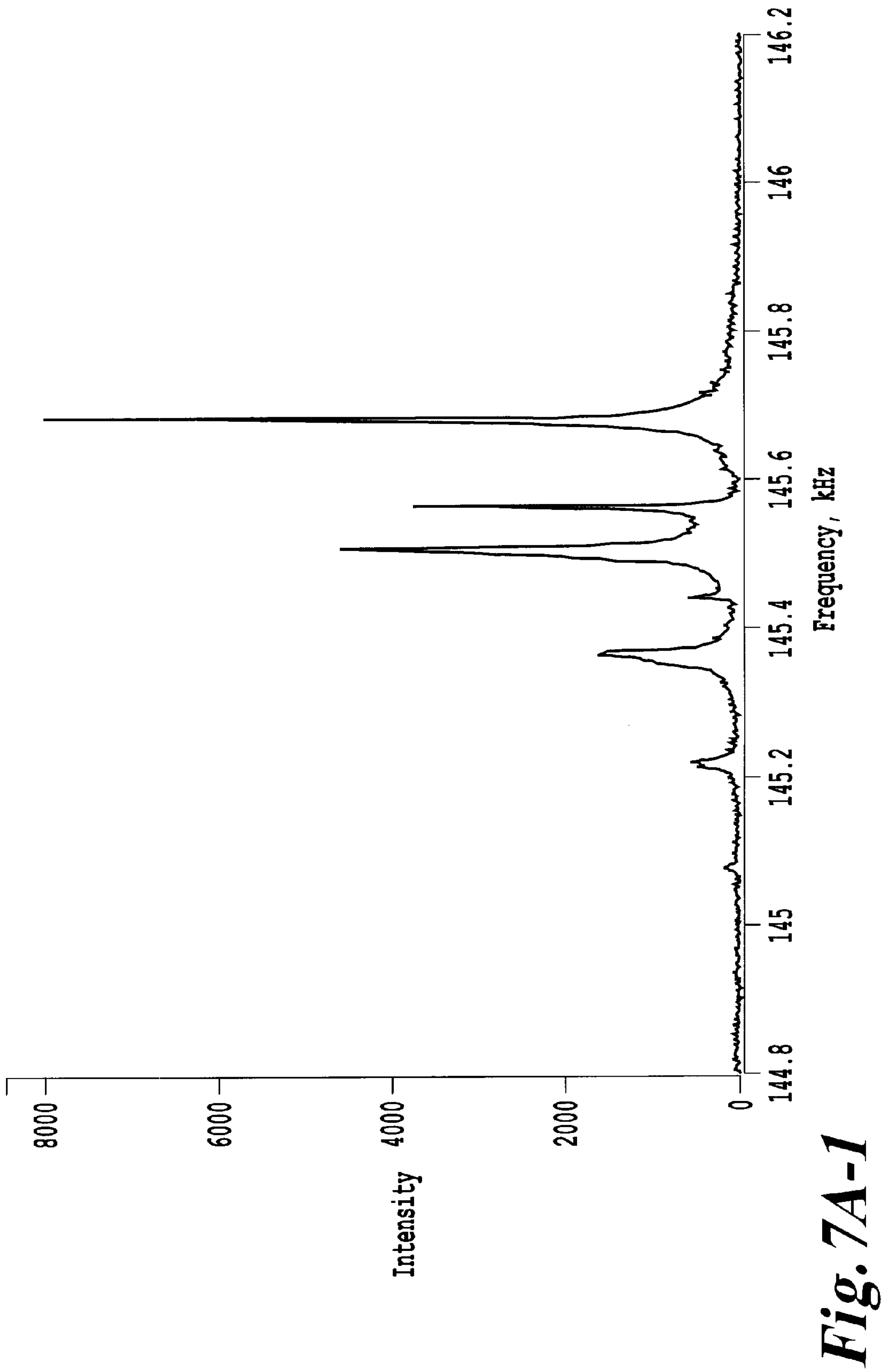
Figures 2, 7A:
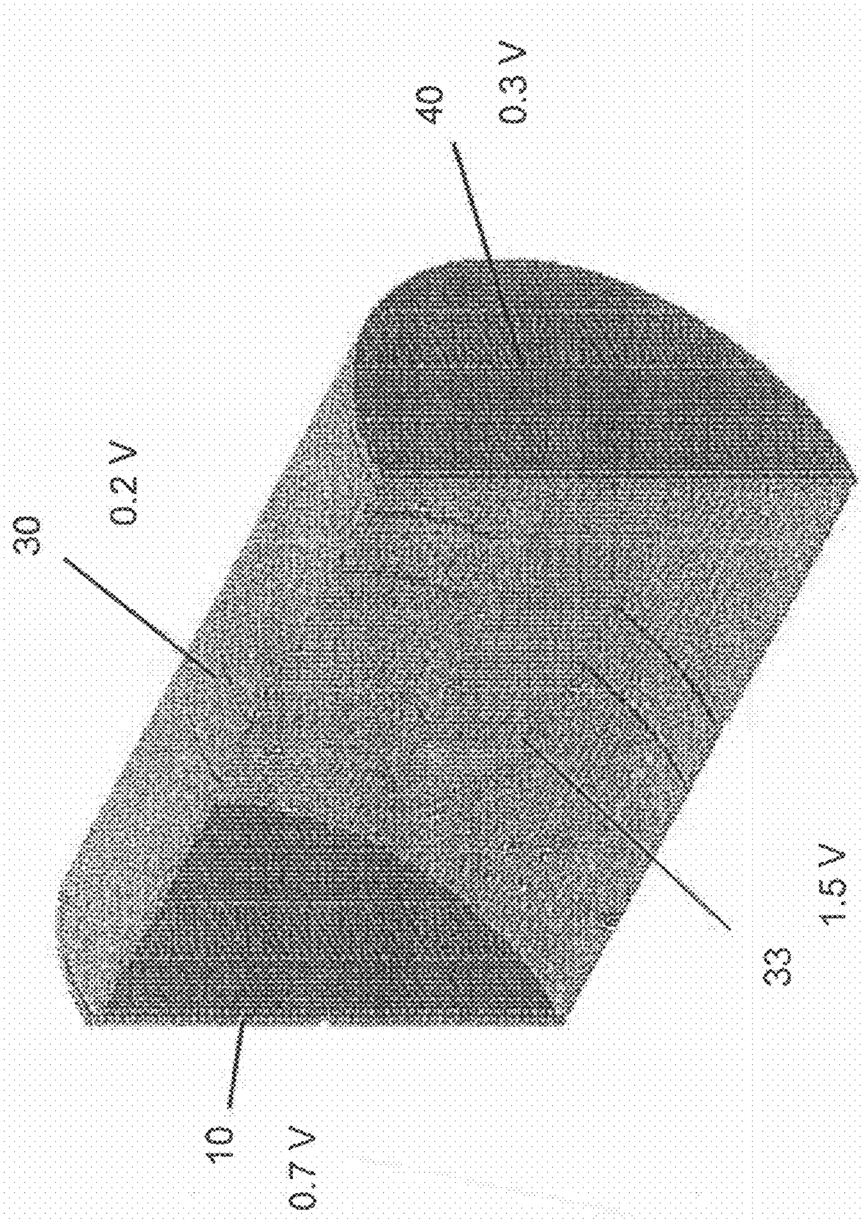

Spectrum in the FIG. 7A-1 was obtained when, after excitation of the cyclotron motion, a part of the ion population was transferred to the "detection" compartment while another part of the ion population remained in the "excitation" compartment. Ions were detected both in the "excitation" and "detection" compartments simultaneously.

FIG. 7A-2 shows voltage potentials applied across the electrodes 10, 30, 33, and 40 of the "O-trap" cell at the end of the ion transfer process; the same potentials were also kept during the subsequent ion detection. Potentials applied across the other electrodes of the "O-trap" ICR cell were essentially zero during the said ion transfer and subsequent ion detection processes. The configuration of the potentials indicated in the FIG. 7A-2 allowed keeping the said above parts of the ion population in the excitation and detection compartments of the "O-trap" cell respectively during the ion detection process, thus resulting in the spectrum shown in the FIG. 7A-1.

Figures 1, 7B:
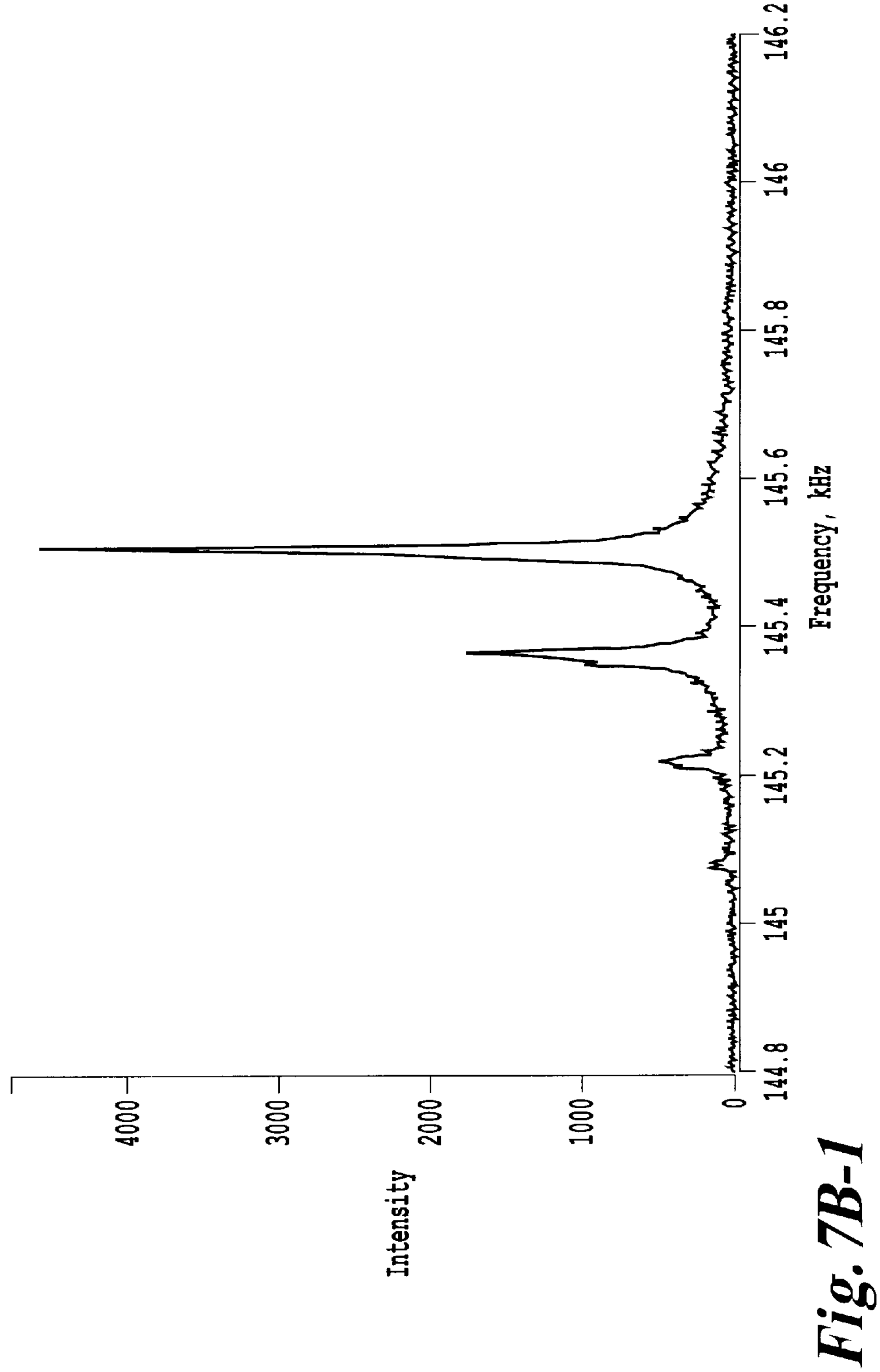
Figures 2, 7B:
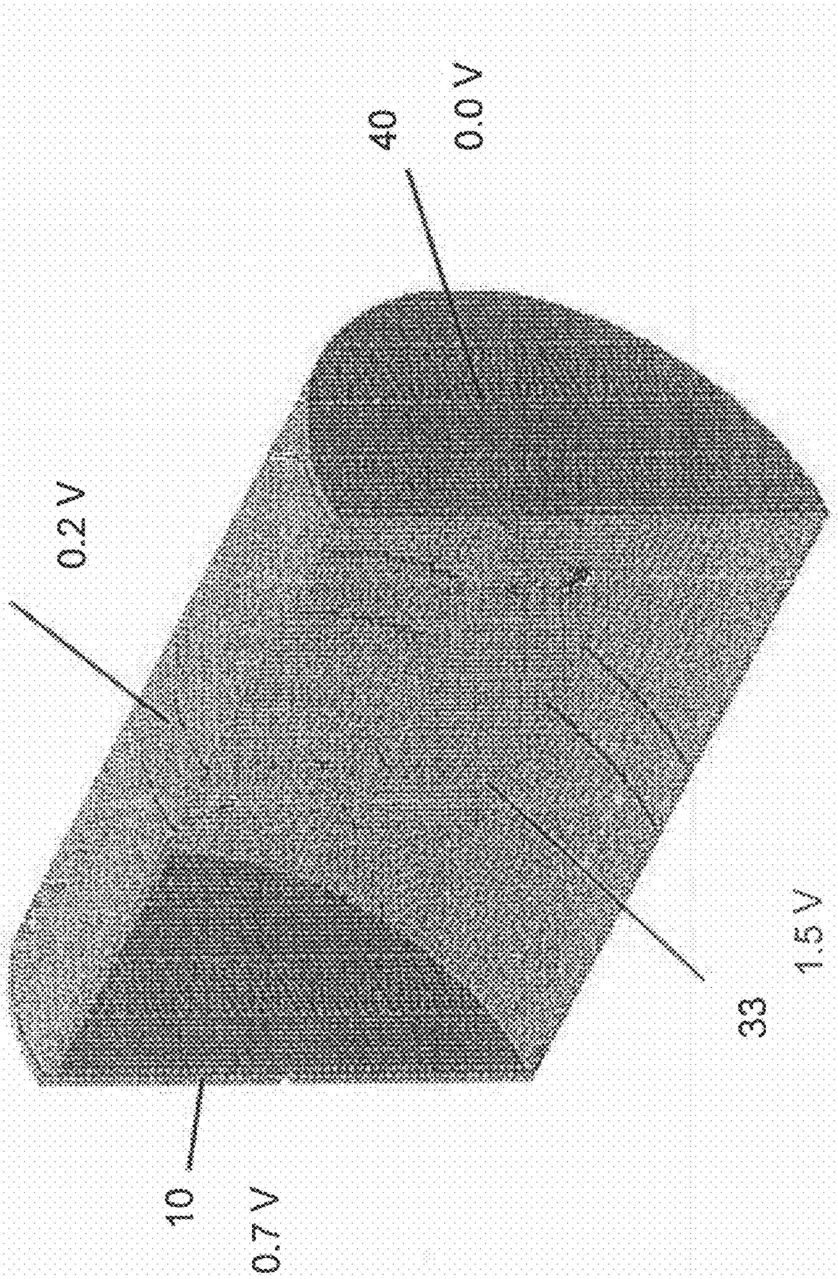

Spectrum in the FIG. 7B-1 was obtained when part of the ion population was transferred to the "detection" compartment but not trapped there. Ions remained in the "excitation" compartment were detected.

FIG. 7B-2 shows voltage potentials applied across the electrodes 10, 30, 33, and 40 of the "O-trap" cell at the end of the ion transfer process; the same potentials were also kept during the subsequent ion detection process. Potentials applied across the other electrodes of the "O-trap" ICR cell were essentially zero during the said ion transfer and subsequent ion detection processes. The configuration of the potentials indicated in the FIG. 7B-2 allowed keeping the above part of the ion population remained in the "excitation" compartment in the said "excitation" compartment during the ion detection process, thus resulting in the spectrum shown in the FIG. 7B-1. The indicated above part of the ion population which was transferred to the "detection" compartment was not kept there during the ion detection process and thus did not contribute to the spectrum shown in FIG. 7B-1.

Figures 1, 7C:
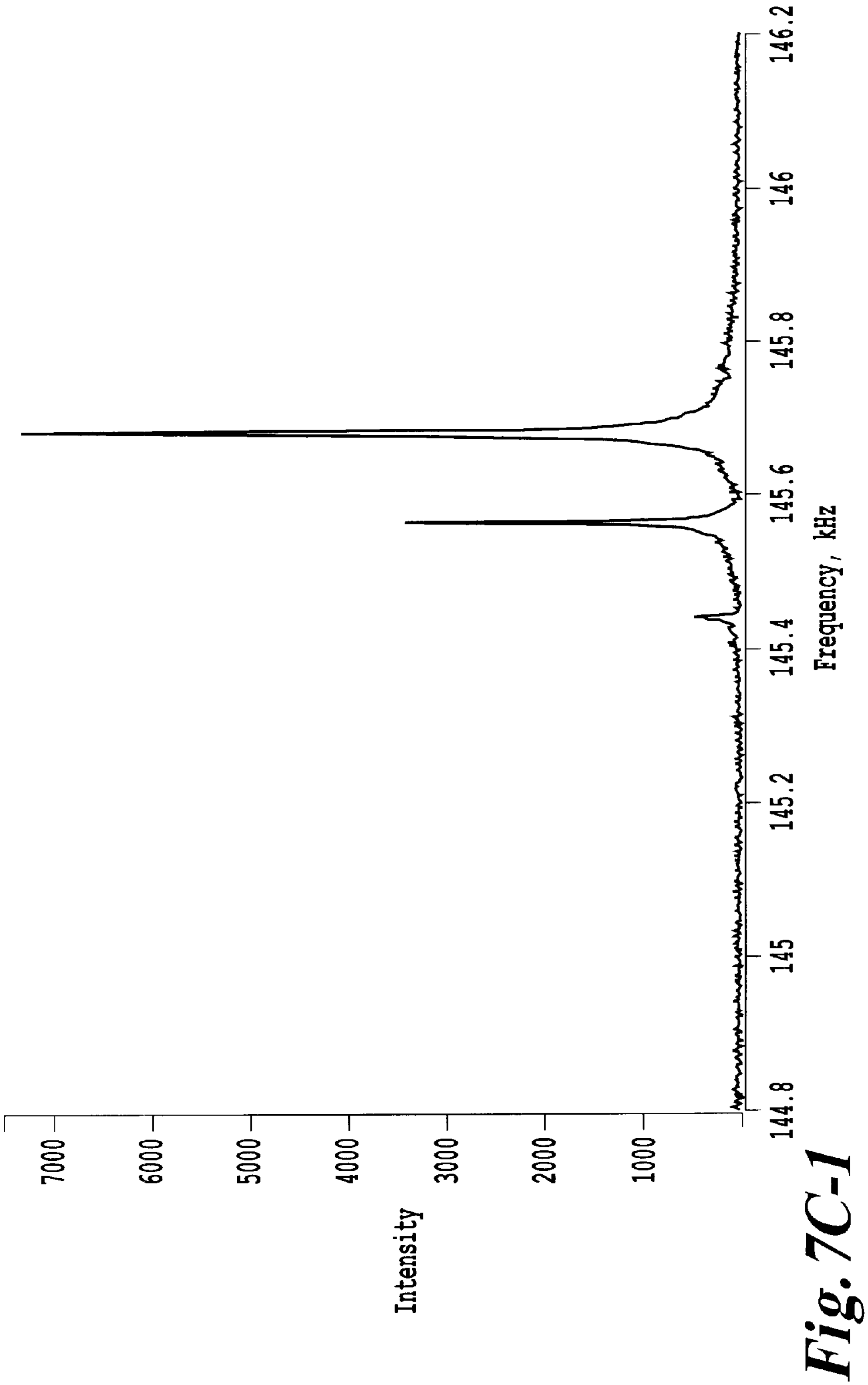
Figures 2, 7C:
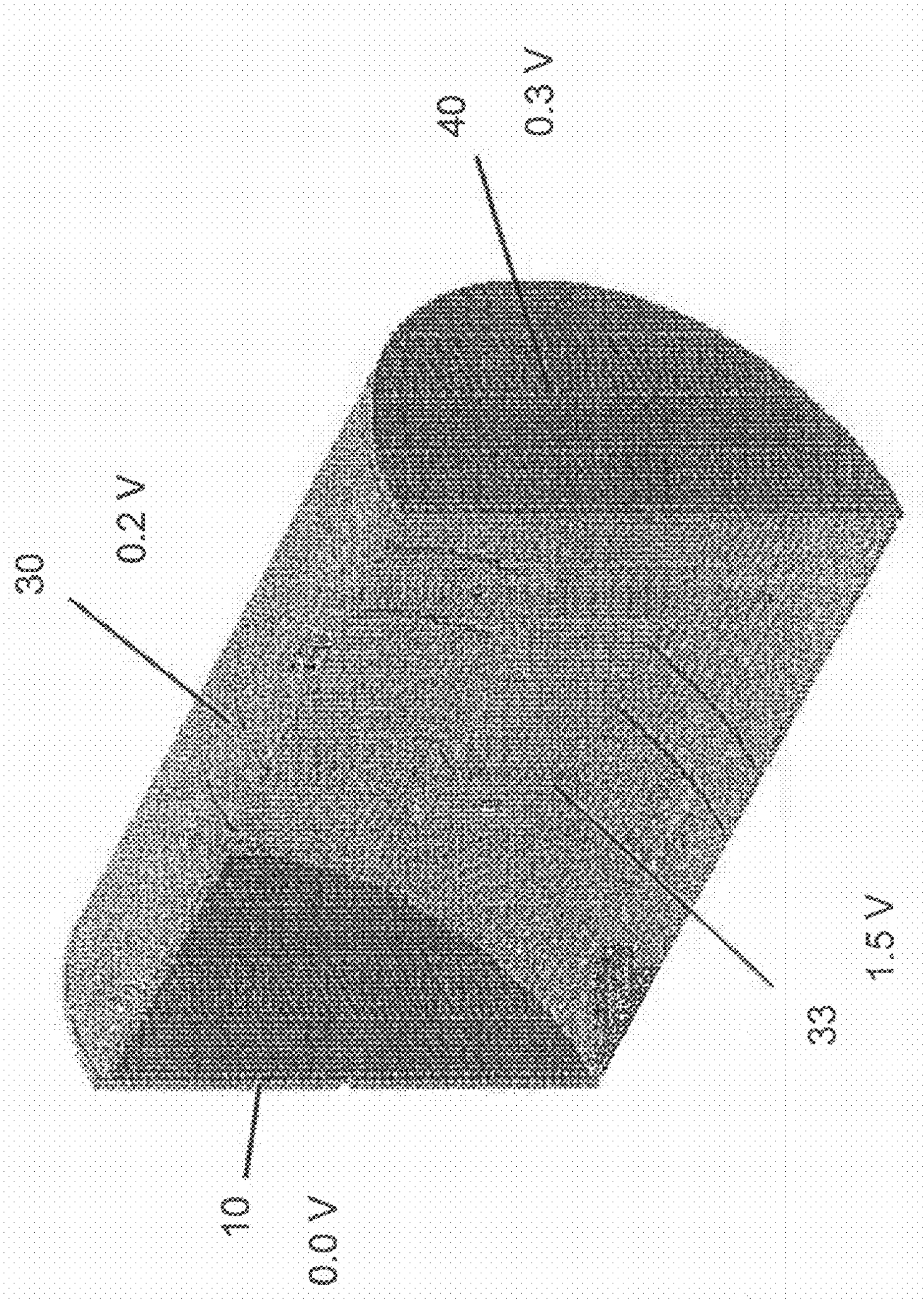

Spectrum in the FIG. 7C-1 was obtained when part of the ions was transferred to the "detection" compartment and trapped there. Ions remained in the "excitation" compartment were ejected. Ions in the "detection" compartment were detected.

FIG. 7C-2 shows voltage potentials applied across the electrodes 10, 30, 33, and 40 of the "O-trap" cell at the end of the ion transfer process; the same potentials were also kept during the subsequent ion detection process. Potentials applied across the other electrodes of the "O-trap" ICR cell were essentially zero during the said ion transfer and subsequent ion detection processes. The configuration of the potentials indicated in the FIG. 7B-2 allowed keeping the above part of the ion population trapped in the "detection" compartment in the "detection" compartment during the ion detection process, thus resulting in the spectrum shown in the FIG. 7C-1. The indicated above part of the ion population which remained in the "excitation" compartment was not kept there during the ion detection process and thus did not contribute to the spectrum shown in FIG. 7C-1.

In all these experiments, the same potentials were utilized during ion capture into the "excitation" compartment, excitation and ion transfer except for the trapping potentials across the electrodes 10 and 40 (FIG. 6) at the end of the ion transfer process (FIG. 7). The radius of the cyclotron motion 120 and 60 was the same for ions in both compartments. Because of this choice, trapping conditions were not optimal for ions in the "excitation" compartment because different compartments have different geometry and hence different "optimal" radii of the ion cyclotron motion for the given values of the trapping voltages. This was reflected in the spectra by lower resolution ion signal from the "excitation" compartment.

Ions trapped in different compartments of the O-trap produced distinct signals in the spectra. Also, the spectrum in the FIG. 7A-1 can be represented as a sum (linear combination) of the spectra shown in FIGS. 7B-1 and 7C-1.

Figure 8:
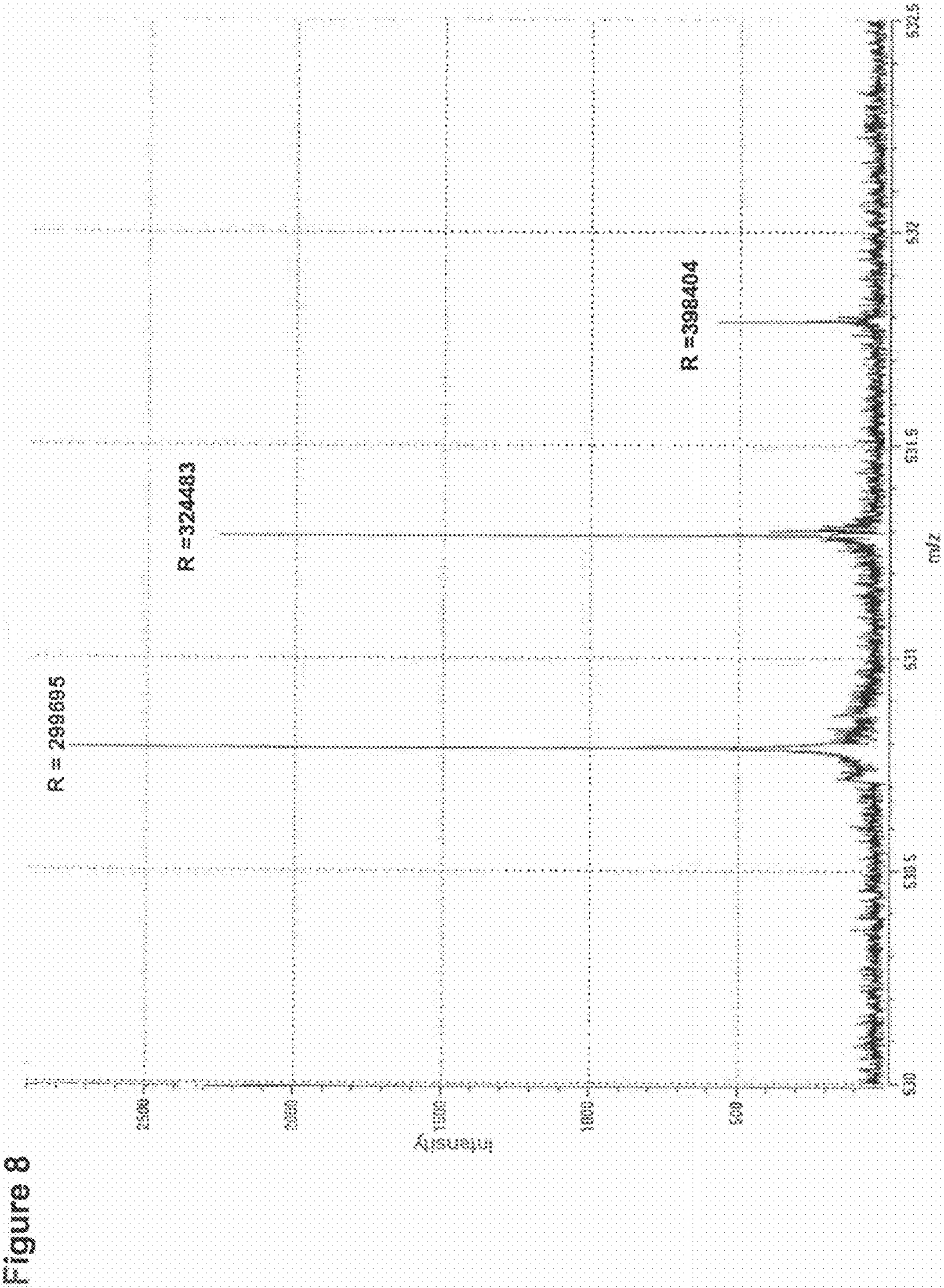
FIG. 8 a schematic of an ultra-high resolution mass spectrum obtained from the "detection" compartment of the "O-trap" cell after ion transfer form its "excitation" compartment.

Also, using the same 5 T magnet indicated above, the inventors have obtained spectra with above 300,000 resolving power for m/z 530 ions of bradykinin 2+ using detection on the third frequency multiple ($3\omega_+$) in the detection compartment of the "O-trap" and 1 s-long detection time (single zero-filling, FIG. 8). These mass spectra collected from the "detection" compartment of the "O-trap" cell indicated that ion transfer process implemented according to the invention allowed preserving coherence of the ion cyclotron motion and did not lead to any significant increase of the ion "translational temperature" in the course of the ion transfer process.

Accordingly, in one embodiment of the invention, there is provided an ICR mass spectrometer including an ICR cell 111 with a first compartment of the cell 111 positioned spatially along a direction of a magnetic field of the mass spectrometer and a second compartment positioned spatially along the direction of the magnetic field. The first and second compartments have corresponding electrodes and a common electrode shared between the first and second compartments.

The devices used for generation of the voltage potentials applied across the electrodes of the cell 111 during its operation including ion trapping, excitation of the ion cyclotron motion, ion transfer, and ion detection, and pickup of the signal generated by the ion motion in the detection electrodes (detecting elements) of the cell during ion detection are shown illustratively in FIGS. 1 and 4 as devices 100, 103, 104, and 106 which are associated with a processor 102 and have lead lines 114 connected to the electrodes and/or detecting elements in cell 111.

The processor 102 and devices 100, 103, 104, and 106 can control any of the elements of cell 111. Processor 102 can have a central processing unit (CPU) with a storage medium on which is provided in code form instructions for operating the cell 111 according to the methods described herein. Processor 102 can include a bus or other communication mechanism for communicating information, and a main memory, such as a random access memory (RAM) or other dynamic storage device (e.g., dynamic RAM (DRAM), static RAM (SRAM), and synchronous DRAM (SDRAM)), coupled to the bus for storing information and instructions to be executed by the processor or for storing the mass spectra data collected from cell 111.

In addition, the main memory may be used for storing temporary variables or other intermediate information during the execution of instructions by the processor. The processor can further include a read only memory (ROM) or other static storage device (e.g., programmable read only memory (PROM), erasable PROM (EPROM), and electrically erasable PROM (EEPROM)) coupled to the bus for storing static information and instructions for the processor.

Processor 102 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)) to implement control of cell 111.

Instructions may be read into the main memory of the processor from another computer readable medium, such as a hard disk or a removable media drive. One or more processors in a multi-processing arrangement may also be employed to execute the sequences of instructions contained in main memory. In alternative embodiments, hard-wired circuitry may be used in place of or in combination with software instructions.

The, embodiments of processor 102 and devices 100, 103, 104, and 106) are not limited to any specific combination of hardware circuitry and software.

The ion trapping device 100 can be configured (i.e., programmed in software or hardware and connected to electrodes 10, and 30) to trap ions in the first compartment of the cell 111 by establishment of an electric potential well in the direction of the magnetic field with a position of a minimum of the electric potential well located inside the first compartment.

The ion excitation device 103 can be configured (i.e., programmed in software or hardware and connected to electrodes 15, and 18) to apply voltage waveforms to the excitation electrodes 15, and 18 of the cell 111, inducing excitation of the ion cyclotron motion of the ions trapped in the first compartment of the cell 111. As an example, a sine waveform with the frequency equal to the reduced frequency of the ion cyclotron motion (if only the ions of a specific m/z ratio are present in the cell) can be applied across the electrode 15 (FIG. 1) while another sine waveform of the same frequency and π radians phase shift relative to the first waveform can be applied across the electrode 18 (FIG. 1) of the cell 111 in order to excite the ion cyclotron motion of the ions. When ions of different m/z values are trapped in the first compartment of the cell 111, application of more sophisticated (such as chirp or stored waveform inverse Fourier transform (SWIFT)-generated) waveforms across the excitation electrodes of the cell 111 (15, 18 in FIG. 1) can be utilized.

The purpose of the excitation is to excite cyclotron motion of the ions. In general, excitation voltages are applied across the excitation electrodes 15, 18 of the ICR cell and oscillate at the same frequency as that of the ion cyclotron motion thus bringing the ions into resonance and increasing the amplitude of their cyclotron motion ("pumping" energy into the cyclotron motion). The excitation voltages also serve to bring the ion cloud (which is initially at the center of the cell) into (generally) coherent cyclotron motion with sufficiently large (for the purpose of subsequent detection) radii of their cyclotron motion.

The transfer device 104 can be configured (i.e., programmed in software or hardware and connected to for example electrodes 10, 30, and 40) to transfer at least a part of the excited ions from the first compartment to the second compartment by a displacement of the position of the minimum of the electric potential well toward the second compartment.

In one embodiment, the transfer device 104 is programmed to control the displacement of the position of the minimum of the electric potential well such that displacement toward the second compartment occurs over a period of time within a range of 1 to 100 characteristic periods of ion oscillations along the direction of the magnetic field in the electric potential well. In another embodiment, the displacement occurs over a period of time within a range of 100 to 10,000 characteristic periods of ion oscillations along the direction of the magnetic field in the electric potential well. In yet another embodiment, the displacement occurs over a period of time within a range of 10,000 to 1,000,000 characteristic periods of ion oscillations along the direction of the magnetic field in the electric potential well.

In one embodiment, the transfer device 104 is programmed to change a spatial profile of electric potential well during the displacement. In one embodiment, the transfer device 104 is programmed to change a depth of the minimum of the electric potential well during the displacement. In one embodiment, the transfer device 104 is programmed to change the depth of the electric potential well such that a potential energy of the ions trapped in the electric potential well is changed. In one embodiment, the transfer device 104 is programmed to vary a rate of the displacement during ion transfer. In one embodiment, the transfer device 104 is programmed to maintain a rate of the displacement during ion transfer to essentially zero during a portion of the ion transfer time interval, thereby permitting cooling of the ions.

In one embodiment, the transfer device 104 is programmed to perform the displacement by applying time-varying voltages to at least three of the corresponding electrodes and the common electrode. In one embodiment, the transfer device 104 is programmed to time-vary voltages on the common electrode.

In one embodiment, the first and second compartments are adjacent to each other. In one embodiment, the second compartment is an O-trap cell.

In one embodiment, the ICR mass spectrometer includes a detector 106 connected to electrodes 22 and 24 for detecting ion cyclotron motion of at least a part of the ions in the second compartment. In one embodiment, the detector is configured to detect an image current induced by movement of the ions about electrodes 27 in the second compartment.

In one embodiment, the detector is configured to detect fundamental frequencies of the ion cyclotron motion. In one embodiment, the detector is configured to detect overtone frequencies of the ion cyclotron motion of M-th order (M>1). In one embodiment, the detector is configured to detect overtone frequencies of the ion cyclotron motion of M-th order (M equals 2 or 3).

Numerous modifications and variations of the invention are possible in light of the above teachings. It is therefore to be understood that within the scope of the appended claims, the invention may be practiced otherwise than as specifically described herein.

The invention claimed is:

1. A method of operating a measuring cell of an ICR mass spectrometer, said an ICR cell having a first compartment and a second compartment positioned spatially along a direction of a magnetic field of said mass spectrometer, the method comprising:

trapping ions in the first compartment of the ICR cell by generating an electric potential well in the direction of said magnetic field with a minimum of said electric potential well located inside said first compartment;

exciting cyclotron motion of said ions trapped in the first compartment;

transferring at least a part of the ions having cyclotron motion excited during the said above excitation step from said first compartment to the second compartment by a displacement of a position of the minimum of said electric potential well from the first compartment to the second compartment; and detecting an ion cyclotron motion of at least a part of the ions in said second compartment, wherein said transferring comprises displacing the position of the minimum of said electric potential well from the first compartment to the second compartment preferably over a period of time equal to or longer than a characteristic period of ion oscillations along the direction of said magnetic field in said electric potential well.

2. The method as in claim 1, wherein said displacing comprises displacing the position of the minimum over said period of time which is within a range of 1 to 100 characteristic periods of ion oscillations along the direction of said magnetic field in said electric potential well.

3. The method as in claim 1, wherein said displacing comprises displacing the position of the minimum over said period of time which is within a range of 100 to 10,000 characteristic periods of ion oscillations along the direction of said magnetic field in said electric potential well.

4. The method as in claim 1, wherein said displacing comprises displacing the position of the minimum over said period of time which is within a range of 10,000 to 1,000,000 characteristic periods of ion oscillations along the direction of said magnetic field in said electric potential well.

5. The method as in claim 1, wherein said transferring comprises changing a spatial profile of said electric potential well during said displacement.

6. The method as in claim 1, wherein said transferring comprises changing a depth of the minimum of said electric potential well during said displacement.

7. The method as in claim 6, wherein said transferring comprises altering a potential energy of the ions trapped in said electric potential well.

8. The method as in claim 1, wherein said transferring comprises changing a rate of said displacement during ion transfer to the second compartment.

9. The method as in claim 8, wherein said transferring comprises maintaining said rate essentially at zero during a portion of the ion transfer time interval of said ion transfer.

10. The method as in claim 1, wherein said transferring comprises transferring said part of the excited ions between adjacent first and said second compartments.

11. The method as in claim 1, wherein said transferring comprises applying, during said displacement, time-varying voltages to at least three electrodes in the first or second compartments.

12. The method as in claim 11, wherein applying time-varying voltages to at least three of said electrodes comprises applying the time-varying voltages to at least a common electrode to the first and second compartments.

13. The method as in claim 1, wherein said exciting of the cyclotron motion comprises applying excitation voltages to the electrodes of the first compartment.

14. The method as in claim 1, wherein said detecting an ion cyclotron motion comprises detecting an image current induced by said ion cyclotron motion of the ions in the second compartment.

15. The method as in claim 1, wherein said transferring at least a part of the excited ions comprises transferring the excited ions to an "O-trap"-geometry cell.

16. The method as in claim 1, wherein said detecting an ion cyclotron motion comprises detecting fundamental frequencies of the ion cyclotron motion.

17. The method as in claim 1, wherein said detecting an ion cyclotron motion comprises detecting overtone frequencies of an ion cyclotron motion of M-th order (M>1).

18. The method as in claim 17, wherein said detecting an ion cyclotron motion comprises detecting overtone frequencies of an ion cyclotron motion of M-th order where M equals 2 or 3.

19. An ICR mass spectrometer system comprising:

an ICR cell having a first compartment positioned spatially along a direction of a magnetic field of the mass spectrometer and a second compartment positioned spatially along the direction of the magnetic field;

said first and second compartments including corresponding electrodes and a common electrode shared between the first and second compartments;

an ion trapping device configured to trap ions in the first compartment by establishment of an electric potential well in the direction of the magnetic field with a position of a minimum of said electric potential well substantially located inside said first compartment;

an ion excitation device configured to excite cyclotron motion of the ions trapped in the first compartment; and a transfer device configured to transfer at least a part of the excited ions from said first compartment to the second compartment by a displacement of the position of the minimum of said electric potential well toward the second compartment; and a detector for detecting ion cyclotron motion of at least a part of the ions in said second compartment, wherein the transfer device is programmed to control the displacement of the position of the minimum of said electric potential well such that the displacement toward the second compartment occurs preferably over a period of time equal to or longer than a characteristic period of ion oscillations along the direction of said magnetic field in the said electric potential well.

20. The system as in claim 19, wherein the transfer device is programmed to displace the position of the minimum over said period of time which is within a range of 1 to 100 characteristic periods of ion oscillations along the direction of said magnetic field in said electric potential well.

21. The system as in claim 19, wherein the transfer device is programmed to displace the position of the minimum over said period of time which is within a range of 100 to 10,000 characteristic periods of ion oscillations along the direction of said magnetic field in said electric potential well.

22. The system as in claim 19, wherein the transfer device is programmed to displace the position of the minimum over said period of time which is within a range of 10,000 to 1,000,000 characteristic periods of ion oscillations along the direction of said magnetic field in said electric potential well.

23. The system as in claim 19, wherein the transfer device is programmed to change a spatial profile of said electric potential well during said displacement.

24. The system as in claim 19, wherein the transfer device is programmed to change a depth of the minimum of said electric potential well during said displacement.

25. The system as in claim 24, wherein the transfer device is programmed to change said depth such that a potential energy of the ions trapped in said electric potential well is changed.

26. The system as in claim 19, wherein the transfer device is programmed to vary a rate of said displacement during said ion transfer.

27. The system as in claim 26, wherein the transfer device is programmed to maintain said rate to essentially zero during a time interval of said ion transfer.

28. The system as in claim 19, wherein the first and second compartments are adjacent to each other.

29. The system as in claim 19, wherein the transfer device is programmed to perform said displacement by applying, during said displacement, time-varying voltages to at least three electrodes in the first or second compartments.

30. The system as in claim 29, wherein applying time-varying voltages to at least three of said electrodes comprises applying the time-varying voltages to at least a common electrode to the first and second compartments.

31. The system as in claim 19, wherein the ion excitation device is configured to apply excitation voltages to electrodes of the first compartment.

32. The system as in claim 19, wherein the second compartment comprises an "O-trap"-geometry cell.

33. The system as in claim 19, wherein the detector is configured to detect an image current induced by said ion cyclotron motion of the ions in the second compartment.

34. The system as in claim 33, wherein the detector is configured to detect fundamental frequencies of the ion cyclotron motion.

35. The system as in claim 33, wherein the detector is configured to detect overtone frequencies of the ion cyclotron motion of M-th order (M>1).

36. The system as in claim 35, wherein M equals 2 or 3.

* * * * *